US006932560B2

(12) United States Patent
Brooks

(10) Patent No.: US 6,932,560 B2
(45) Date of Patent: Aug. 23, 2005

(54) APPARATUS AND METHOD FOR DETECTING AN IMPACT ON A ROTOR BLADE

(75) Inventor: Richard V Brooks, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/277,133

(22) Filed: Oct. 22, 2002

(65) Prior Publication Data

US 2005/0129498 A1    Jun. 16, 2005

(30) Foreign Application Priority Data

Nov. 7, 2001 (GB) .................................. 0126706

(51) Int. Cl.[7] .............................................. F03B 15/00
(52) U.S. Cl. ........................................ 415/1; 415/118
(58) Field of Search ...................... 415/1, 118, 47–49; 416/26; 29/889.1, 889.12, 889.2, 889.21

(56) References Cited

U.S. PATENT DOCUMENTS

| 3,502,967 A |   | 3/1970 | Bridges |
|---|---|---|---|
| 4,049,644 A | * | 9/1977 | Wennerstrom ............... 250/233 |
| 4,329,138 A |   | 5/1982 | Riordan |
| 4,334,427 A |   | 6/1982 | Armstrong |
| 4,955,269 A | * | 9/1990 | Kendig et al. ................. 73/577 |
| 5,206,816 A | * | 4/1993 | Hill et al. .................... 364/508 |
| 5,471,880 A | * | 12/1995 | Lang et al. .................... 73/660 |
| 5,594,665 A | * | 1/1997 | Walter et al. ................ 364/558 |
| 5,622,045 A |   | 4/1997 | Weimer |
| 5,866,824 A | * | 2/1999 | Schieber ................... 73/861.79 |
| 5,887,419 A | * | 3/1999 | Rowe et al. ................... 60/223 |
| 6,094,989 A | * | 8/2000 | Twerdochlib ................. 73/659 |
| 6,176,074 B1 |   | 1/2001 | Thompson |
| 6,195,247 B1 | * | 2/2001 | Cote et al. ................... 361/253 |
| 6,231,306 B1 | * | 5/2001 | Khalid ......................... 416/26 |
| 6,267,013 B1 | * | 7/2001 | Stark et al. .............. 73/861.77 |
| 6,456,945 B1 | * | 9/2002 | Sonnichsen et al. .......... 702/56 |

FOREIGN PATENT DOCUMENTS

| EP | 284392 A | 9/1988 |
|---|---|---|
| EP | 762134 A | 3/1997 |
| EP | 844377 A | 5/1998 |
| SU | 1174940 A | 4/1984 |
| WO | WO 99/09642 | 2/1999 |

* cited by examiner

*Primary Examiner*—Edward K. Look
*Assistant Examiner*—Igor Kershteyn
(74) *Attorney, Agent, or Firm*—W. Warren Taltavull; Manelli Denison & Selter PLLC

(57) ABSTRACT

A gas turbine engine (10) comprises a fan rotor (26) having a plurality of fan blades (24) and an apparatus (34) for detecting an impact on the fan blades (24). The apparatus (34) comprises speed sensors (48,48B) arranged to measure the speed of rotation of the fan rotor (26) and the turbine rotor (58) and to produce speed signals. A processor unit (40) analyses the speed signals to determine the angle of twist between the ends of the fan rotor (26). The processor unit (40) is arranged to analyse the angle of twist to determine if the angle of twist of the fan rotor (40) oscillates by more than a predetermined level from an average level. The processor unit (40) is arranged to produce a signal indicative of an impact to at least one of the fan blades (24) if the angle of twist oscillates by more than the predetermined level and sends a signal to an indicator device (44,46).

26 Claims, 3 Drawing Sheets

APPARATUS AND METHOD FOR DETECTING AN IMPACT ON A ROTOR BLADE

FIELD OF THE INVENTION

The present invention relates to an apparatus and method for detecting an impact on a rotor blade, in particular for detecting an impact on a gas turbine engine fan blade, a gas turbine engine compressor blade, or a gas turbine engine turbine blade.

BACKGROUND OF THE INVENTION

Gas turbine engines provided on aircraft are susceptible to objects entering the gas turbine engine. These objects may be relatively soft objects, for example birds, or relatively hard objects, for example stones. The majority of hard objects entering a gas turbine engine are relatively small and produce localised damage to the gas turbine engine blades, for example relatively small dents or nicks. Some of the soft objects entering the gas turbine engine frequently produce no damage to the gas turbine engine blades. However, some relatively large soft objects, for example birds, entering the gas turbine engine produce widespread damage to the gas turbine engine blades.

Gas turbine engine blades may also suffer damage, on very rare occasions, by colliding with other blades or vanes in an adjacent row of blades or an adjacent row of vanes. The collision with other blades, or vanes, may result in widespread damage to the gas turbine engine blades.

It is highly desirable to detect widespread damage to a gas turbine engine blade before it causes failures.

Gas turbine engine blades are periodically inspected for damage. If a damaged gas turbine engine blade is detected it is replaced, or repaired, as required. In the case of gas turbine engines provided on aircraft, the gas turbine engines are visually inspected prior to each flight. However, these pre-flight inspections often take place under difficult circumstances and damaged gas turbine engine blades may not always be detected by the pre-flight inspection.

SUMMARY OF THE INVENTION

Accordingly the present invention seeks to provide a novel apparatus and method for detecting an impact on one or more rotor blades which may not have been detected by pre-use inspection.

Accordingly the present invention seeks to provide a novel apparatus and method for detecting an impact on one or more rotor blades while the rotor blades are in operation.

Accordingly the present invention provides a machine comprising a rotor having a plurality of blades arranged in a set, an apparatus for detecting an impact on one or more of the blades comprising at least one speed sensor arranged to detect the speed of rotation of the rotor and to produce at least one speed signal corresponding to the speed of rotation of the rotor, a processor unit being arranged to analyse the at least one speed signal to determine if the speed of rotation of the rotor reduces by more than a predetermined level, the processor unit being arranged to produce a signal indicative of an impact to at least one of the blades if the speed of rotation reduces by more than the predetermined level and to send the signal to an indicator device.

Preferably the rotor has a first axial end and a second axial end, the blades being arranged at the first axial end of the rotor.

The speed sensor is arranged adjacent the first axial end of the rotor and the processor unit may be arranged to analyse the at least one speed signal to determine if the speed of rotation of the rotor reduces above a predetermined rate.

The processor unit may be arranged to determine if the speed of rotation of the rotor reduces at a rate of more than 500 rpm per second.

The processor unit may be arranged to determine if the speed of rotation of the rotor reduces at a rate of between 500 rpm per second and 1000 rpm per second.

The processor unit may be arranged to analyse the at least one speed signal to determine if the speed of rotation of the rotor reduces at a rate of more than 7% per second.

Preferably the apparatus comprises a first speed sensor and a second speed sensor, the first speed sensor is arranged adjacent the first end of the rotor and the second speed sensor is arranged adjacent the second end of the rotor, the first speed sensor is arranged to detect the speed of rotation of the first end of the rotor and to produce at least one speed signal corresponding to the speed of rotation of the first end of the rotor, the second speed sensor is arranged to detect the speed of rotation of the second end of the rotor and to produce at least one speed signal corresponding to the speed of rotation of the second end of the rotor, the processor unit is arranged to analyse the speed signals to determine the difference in speed between the first end and the second end of the rotor to determine the angle of twist between the first end and the second end of the rotor, the processor unit is arranged to analyse the angle of twist to determine if the angle of twist of the rotor oscillates by more than a predetermined level from an average level, the processor unit being arranged to produce a signal indicative of an impact to at least one of the blades if the angle of twist oscillates by more than the predetermined level and to send the signal to an indicator device.

The processor unit may be arranged to analyse the angle of twist to determine if the amplitude of the oscillation of the angle of twist of the rotor is more than 0.5°.

The processor unit may be arranged to analyse the angle of twist to determine if the amplitude of the oscillation of the angle of twist of the rotor is between 0.5° and 1°.

Preferably the machine is a gas turbine engine.

Preferably the blades are fan blades or compressor blades.

The present invention also provides a method of detecting an impact on one or more blades of a machine, the machine comprising a rotor having a plurality of blades arranged in a set, the method for detecting an impact on one or more of the blades comprising detecting the speed of rotation of the rotor and to produce at least one speed signal corresponding to the speed of rotation of the rotor, analysing the at least one speed signal to determine if the speed of rotation of the rotor reduces by more than a predetermined level, producing a signal indicative of an impact to at least one of the blades if the speed of rotation reduces by more than the predetermined level and sending the signal to an indicator device.

Preferably the rotor has a first axial end and a second axial end, the blades being arranged at the first axial end of the rotor.

The method may comprise detecting the speed of rotation of the rotor adjacent the first axial end of the rotor and analysing the at least one speed signal to determine if the speed of rotation of the rotor reduces above a predetermined rate.

The method may comprise determining if the speed of rotation of the rotor reduces at a rate of more than 500 rpm per second.

The method may comprise determining if the speed of rotation of the rotor reduces at a rate of between 500 rpm per second and 1000 rpm per second.

The method may comprise analysing the at least one speed signal to determine if the speed of rotation of the rotor reduces at a rate of more than 7% per second.

Preferably the method comprises detecting the speed of rotation of the first end of the rotor to produce at least one speed signal corresponding to the speed of rotation of the first end of the rotor, detecting the speed of rotation of the second end of the rotor to produce at least one speed signal corresponding to the speed of rotation of the second end of the rotor, analysing the speed signals to determine the difference in speed between the first end and the second end of the rotor to determine the angle of twist between the first end and the second end of the rotor, analysing the angle of twist to determine if the angle of twist of the rotor oscillates by more than a predetermined level from an average level, producing a signal indicative of an impact to at least one of the blades if the angle of twist oscillates by more than the predetermined level and sending the signal to an indicator device.

The method may comprise analysing the angle of twist to determine if the amplitude of the oscillation of the angle of twist of the rotor is more than 0.5°.

The method may comprise analysing the angle of twist to determine if the amplitude of the oscillation of the angle of twist of the rotor is between 0.5° and 1°.

Preferably the machine is a gas turbine engine.

Preferably the blades are fan blades or compressor blades.

BRIEF DESCRIPTION OF THE DRAWINGS

The present invention will be more fully described by way of example with reference to the accompanying drawings in which.

DETAILED DESCRIPTION OF THE INVENTION

Figure 1:
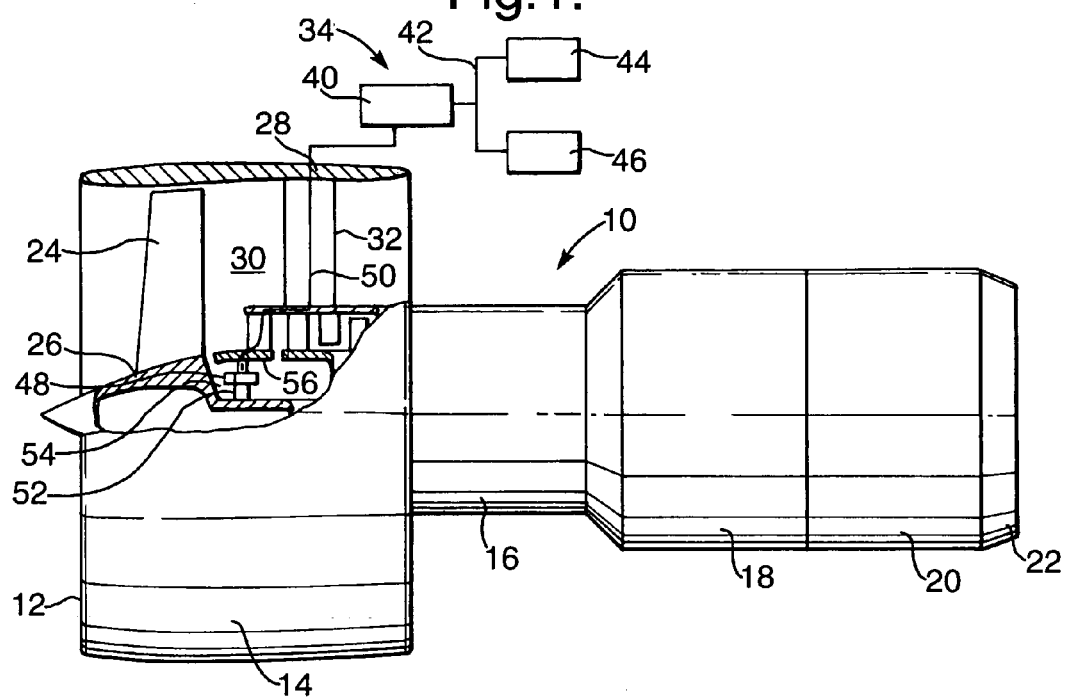
FIG. 1 is a partially cut away view of a turbofan gas turbine engine having an apparatus for detecting an impact on a rotor blade according to the present invention.

A turbofan gas turbine engine 10, as shown in FIG. 1, comprises in axial flow series an inlet 12, a fan section 14, a compressor section 16, a combustion section 18, a turbine section 20 and an exhaust 22. The turbine section 20 is arranged to drive the fan section 14 and compressor section 16 via one or more shafts (not shown). The turbofan gas turbine engine 10 operates quite conventionally and its operation will not be discussed further.

The fan section 14 comprises a plurality of fan blades 24 secured to and extending radially from a fan rotor 26. The fan blades 24 are enclosed by a fan casing 28, which defines a fan duct 30, and the fan casing 28 is secured to the compressor casing by a plurality of radially extending fan outlet guide vanes 32.

It is known to make the fan blades 24 hollow so as to reduce the weight of the fan blades 24. It is also known to make these fan blades 24 by diffusion bonding, or diffusion brazing, a honeycomb core between two outer metallic sheets or by diffusion bonding and superplastically forming a metallic core sheet between two metallic outer sheets to define a hollow interior. It is also known to simply use two outer sheets to define a hollow interior. It is also known to use solid metallic fan blades 24 or composite fan blades 24.

Figure 2:
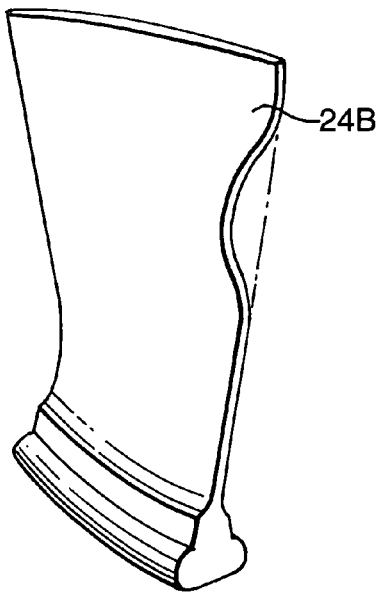
FIG. 2 shows a perspective view of a damaged rotor blade.

As discussed previously there are instances when the impact of one or more large soft foreign objects, for example a bird, produces widespread damage to one or more fan blades 24B, as shown in FIG. 2. The widespread damage to a fan blade disrupts the airflow in the vicinity of the damaged fan blade 24B. The disrupted airflow produces an increase in vibration and hence a reduction in working life of some of the fan blades 24, or even some of the compressor blades. This may even result in the failure of a fan blade 24, or a compressor blade. The impact of one or more small hard foreign objects, for example a stone, produces localised damage, for example nicks, dents or cracks, to one or more fan blades 24. The localised damage to a fan blade 24 does not disrupt the airflow in the vicinity of the damaged fan blade 24.

The gas turbine engine 10 is provided with an apparatus 34 for detecting an impact on the fan rotor 26 and/or at least one fan blade 24.

The apparatus 34 for detecting an impact on the fan rotor 26 and/or at least one fan blade 24 comprises one or more speed sensors 48 to measure the speed of rotation of the fan rotor 26 and the fan blades 24, a processor 40 and one or more indicator devices 44 and 46 to provide an indication of whether there has been an impact on the fan rotor 26 and/or one or more of the fan blades 24.

Each speed sensor 48 is arranged to send a signal indicative of the speed of the fan rotor 26 and fan blades 24 to the processor unit 40 via electrical lead 50. Each speed sensor 48 comprises for example a phonic wheel 52 on the fan rotor 26 and a variable reluctance speed probe 54 on static structure 56 connected to the fan outlet guide vanes 32.

The processor unit 40 is arranged to analyse the signal indicative of the speed of rotation of the fan rotor 26 and fan blades 24 to determine the speed of rotation of the fan rotor 26. In particular the processor unit 40 analyses the speed of rotation of the fan rotor 26, and the fan blades 24, to detect a rapid drop in the speed of rotation of the fan rotor 26, and the fan blades 24, from the correct operating speed of rotation of the fan rotor 26 for the particular flight, or operating, condition.

The processor unit 40 is arranged to produce a signal indicative of an impact on the fan rotor 26 and/or to at least one of the fan blades 24 if the speed of rotation of the fan rotor 26 and the fan blades 24 drops below a predetermined level. The processor unit 40 sends the signal to the indicator device 44 or the indicator device 46 via electrical leads 42. The indicator device 44 is an audible alarm and the indicator device 46 is a visual alarm. The indicator devices 44 and 46 are placed in the aircraft cockpit to warn the pilot that an impact has occurred to the fan rotor 26 and one or more of the fan blades 24 and that the fan blades 24 require checking, repairing or replacing.

EXAMPLE 1

Figure 3:
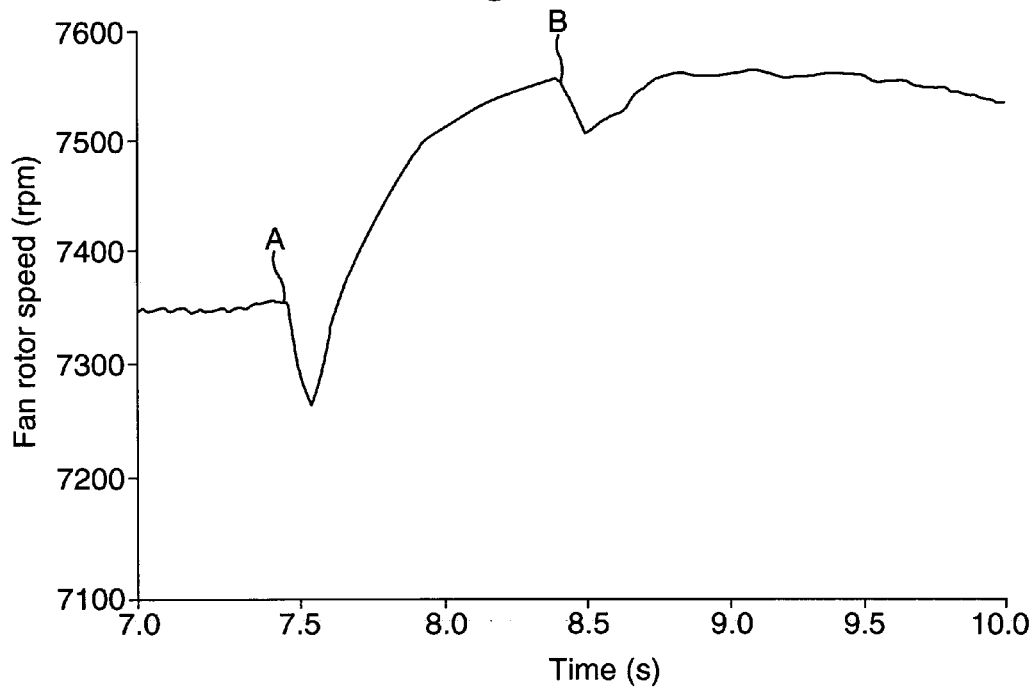
FIG. 3 is a graph showing the speed of rotation of the rotor and rotor blades against time during an impact.

In a bird ingestion test a number of, three, birds were directed into the inlet of a small gas turbine engine 10 and produced damage to one or more fan blades 24 on the fan rotor 26. FIG. 3 shows the variation of the speed of rotation of the fan rotor 26 and fan blades 24 with time during the bird ingestion test. The speed of rotation of the fan rotor 26 and fan blades 24 was substantially a constant 7350 rpm, at this particular operating condition, before the birds were ingested. A first bird struck some of the fan blades 24 adjacent the roots of these fan blades 24 and a second bird struck some of the fan blades 24 adjacent the tips of these fan blades 24 at point A on FIG. 3, at a time of about 7.5 seconds. These two impacts caused the speed of rotation of rotation of the fan rotor 26 and fan blades 24 to drop by 70 rpm, or 0.95%, in 0.12 seconds. A second later at point B on FIG. 3, at a time of about 8.5 seconds, a third bird struck some of the fan blades 24 at mid radial height of these fan blades 24. This impact caused the speed of rotation of the fan rotor 26 and fan blades 24 to drop by 50 rpm from 7550 rpm or 0.6% in 0.06 seconds.

FIG. 3 clearly shows that there is a drop in the speed of rotation of the fan rotor 26 and the fan blades 24 during an impact of a bird at points A and B.

Figure 4:
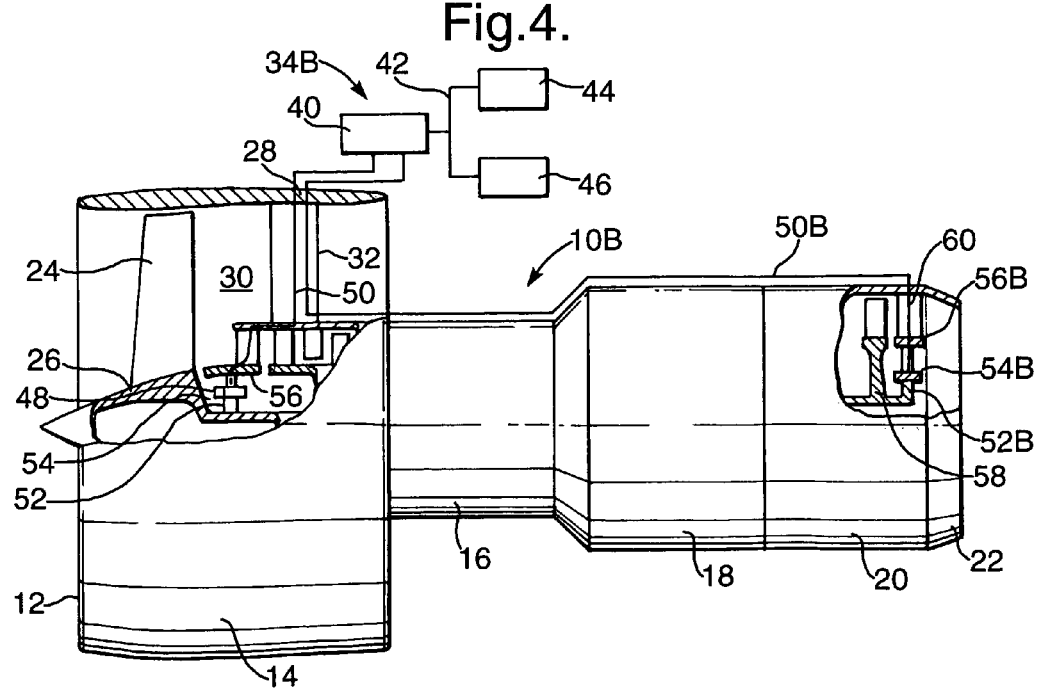
FIG. 4 is a partially cut away view of a turbofan gas turbine engine having a further apparatus for detecting an impact on a rotor blade according to the present invention.

A gas turbine engine 10B, as shown in FIG. 4, is provided with an apparatus 34B for detecting an impact on a fan rotor 26 and at least one of fan blade 24.

The apparatus 34B for detecting an impact on a fan rotor 26 and/or at least one fan blade 24 comprises one or more speed sensors 48 to measure the speed of rotation of the fan rotor 26 and the fan blades 24, one or more speed sensors 48B to measure the speed of rotation of the low pressure turbine rotor 58, a processor 40 and one or more indicator devices 42 and 44 to provide an indication of whether there has been an impact on the fan rotor 26 and/or one or more of the fan blades 24.

Each speed sensor 48 is arranged to send a signal indicative of the speed of the fan rotor 26 and fan blades 24 to the processor unit 40 via electrical lead 50. Each speed sensor 48 comprises for example a phonic wheel 52 on the fan rotor 26 and a variable reluctance speed probe 54 on static structure 56 connected to the fan outlet guide vanes 32.

Each speed sensor 48B is arranged to send a signal indicative of the speed of rotation of the low pressure turbine rotor 58 to the processor unit 40 via electrical lead 50B. Each speed sensor 48B comprises for example a phonic wheel 52B on the low pressure turbine rotor 58 and a variable reluctance speed probe 54B on static structure 56B connected to the turbine guide vanes 60.

The processor unit 40 is arranged to analyse the signal indicative of the speed of rotation of the fan rotor 26 and fan blades 24 and the signal indicative of the speed of rotation of the low pressure turbine rotor 58 to monitor differences in the speed of rotation of the fan rotor 26 and fan blades 24 and the low pressure turbine rotor 58. The difference in the speed of rotation of the fan rotor 26 and fan blades 24 and the low pressure turbine rotor 58 is indicative of changes in the angle of twist of the shaft between the fan rotor 26 and the low pressure turbine rotor 58. The processor 40 is arranged to detect oscillations of the angle of twist above a predetermined level. In particular the processor 40 is arranged to detect oscillations in the angle of twist which are greater than a predetermined amplitude from the average angle of twist for the correct operating speed of rotation of the fan rotor 26 for the particular flight, or operating, condition.

The processor unit 40 is arranged to produce a signal indicative of an impact to at least one of the fan blades 24 if the oscillations in the angle of twist are above a predetermined level. The processor unit 40 sends the signal to the indicator device 44 or the indicator device 46 via electrical leads 42. The indicator device 44 is an audible alarm and the indicator device 46 is a visual alarm. The indicator devices 44 and 46 are placed in the aircraft cockpit to warn the pilot that an impact has occurred to one or more of the fan blades 24 and that the fan blades 24 require checking, repairing or replacing.

EXAMPLE 2

Figure 5:
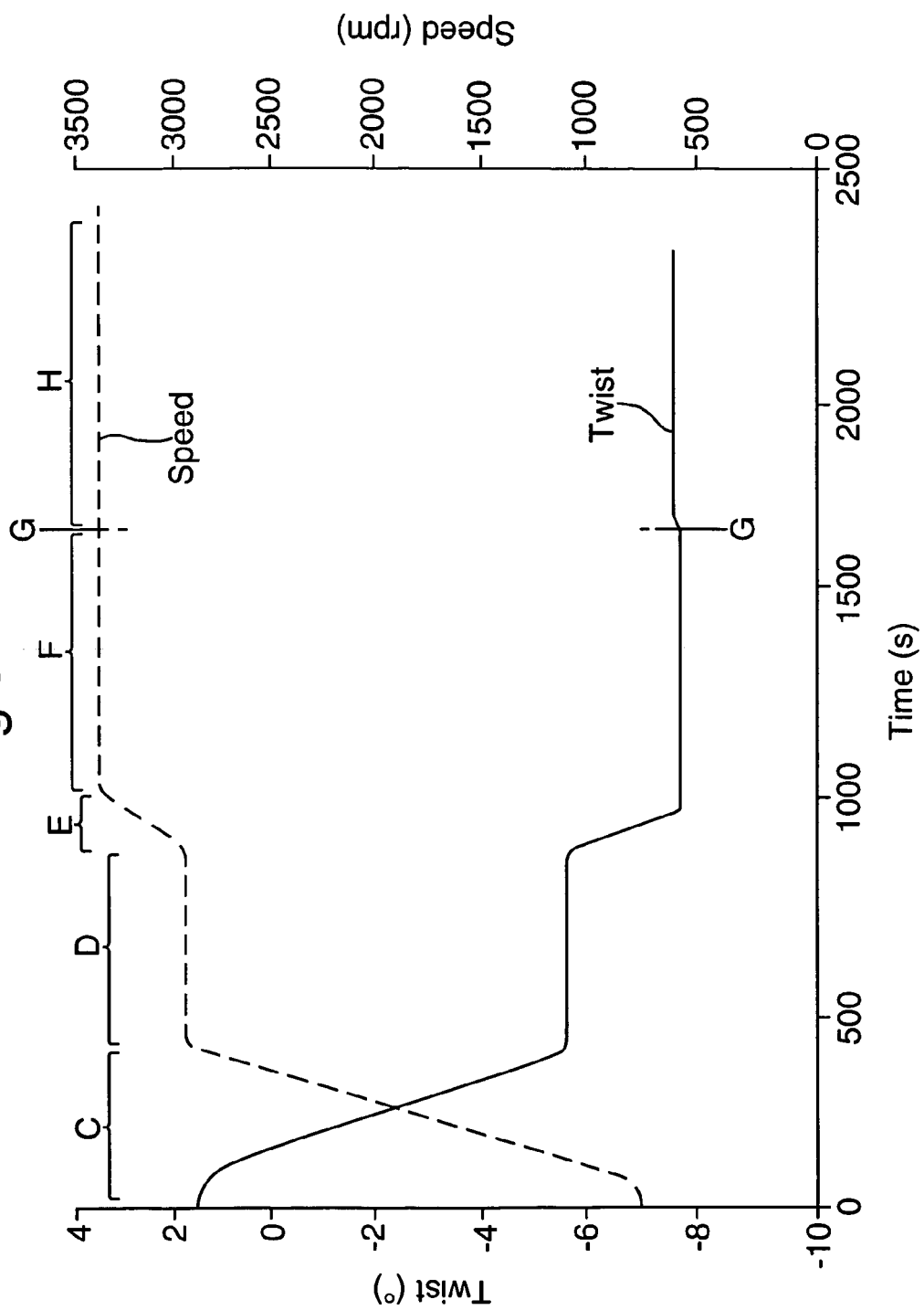
FIG. 5 is a graph showing the speed of rotation of the rotor and rotor blades and the angle of twist of the rotor shaft during an impact.

In a bird ingestion test a number of, three, birds were directed into the inlet of a large gas turbine engine 10 and produced damage to one or more fan blades 24 on the fan rotor 26. FIG. 5 shows the variation of the speed of rotation of the fan rotor 26 and the fan blades 24 and the variation of the twist angle of the fan shaft between the fan rotor 26 and the low pressure turbine rotor 58 with time during the bird ingestion test.

The speed of rotation of the fan rotor 26, the fan blades 24 and the low pressure turbine rotor 58 increased from 750 rpm to about 2900 rpm over time period C and the twist angle changed from +1.50 to −5.5° over the time period C before the birds were ingested. The speed of rotation of the fan rotor 26, the fan blades 24 and the low pressure turbine rotor 58 remained constant over the time period D and the twist angle remained constant over the time period D before the birds were ingested.

The speed of rotation of the fan rotor 26, the fan blades 24 and the low pressure turbine rotor 58 increased from 2900 rpm to 3200 rpm over the time period E and the twist angle changed from −5.5° to −7.9° over the time period E before the birds were ingested. The speed of rotation of the fan rotor 26, the fan blades 24 and the low pressure turbine rotor 58 remained constant over the time period F and the twist angle remained constant over the time period F before the birds were ingested.

The bird impacts, at time G, caused no noticeable change to the speed of rotation of the fan rotor 26, the fan blades 24 and the low pressure turbine rotor 58. However, the bird impacts caused the twist angle to change rapidly between the fan rotor 26 and the low pressure turbine rotor 58 from an average or −7.9° to −7.0° and then to change rapidly from −7.0° to −8.8° and then to change rapidly back to the −7.9° average, constant, level at time G. These changes in the amplitude, or oscillations, of the twist angle about the average twist angle are indicative of an impact of a bird on the fan rotor 26 and/or at least one fan blade 24.

The speed of rotation of the fan rotor 26, fan blades 24 and low pressure turbine rotor 58 again remained constant after the impact over time period H, while the twist angle remained constant over the time period H after the birds were ingested at time G.

FIG. 5 clearly shows that there is an oscillation in the twist angle between the fan rotor 26, and the fan blades 24, and the low pressure turbine rotor 58 during an impact of a bird.

The embodiment described with reference to FIGS. 1 and 3 is suitable for relatively small gas turbine engines, which have fan rotors and low pressure turbine rotors with a relatively low moment of inertia. The embodiment described with reference to FIGS. 4 and 5 is suitable for relatively large gas turbine engines, which have fan rotors and low pressure turbine rotors with a relatively large moment of inertia.

Although the invention has been described with reference to detecting damage to a fan blade, it is equally applicable to detecting damage to a compressor blade or a turbine blade.

Although the invention has been described with reference to detecting damage to gas turbine engine rotor blades it is equally applicable to detecting damage to rotor blades of other turbomachines, for example steam turbines, or for detecting damage to water turbines, aircraft propellers, water propellers, windmills or cooling fans.

Although the invention has been described with reference to the use of a phonic wheel and a variable reluctance motor to measure the speed of rotation of the rotor, other suitable means for measuring the speed of rotation of the rotor may be used.

I claim:

1. A machine comprising a rotor having a plurality of blades arranged in a set, an apparatus for detecting an impact on one or more of the blades comprising at least one speed sensor arranged to detect the speed of rotation of the rotor and to produce at least one speed signal corresponding to the speed of rotation of the rotor, a processor unit being arranged to analyse the at least one speed signal to detect a rapid drop in the speed of rotation of the rotor from a correct operating speed of rotation of the rotor for a particular operating condition, the processor unit being arranged to analyze the at least one speed signal to determine if the speed of rotation of the rotor reduces by more than a predetermined rate, the processor unit being arranged to produce a signal indicative of an impact to at least one of the blades if the speed of rotation reduces by more than the predetermined rate and to send the signal to an indicator device.

2. A machine as claimed in claim 1 wherein the rotor has a first axial end and a second axial end, the blades being arranged at the first axial end of the rotor.

3. A machine as claimed in claim 2 wherein the speed sensor is arranged adjacent the first axial end of the rotor and the processor unit is arranged to analyse the at least one speed signal to determine if the speed of rotation of the rotor reduces above a predetermined rate.

4. A machine as claimed in claim 1 wherein the processor unit is arranged to determine if the speed of rotation of the rotor reduces at a rate of more than 500 rpm per second.

5. A machine as claimed in claim 4 wherein the processor unit is arranged to determine if the speed of rotation of the rotor reduces at a rate of between 500 rpm per second and 1000 rpm per second.

6. A machine as claimed in claim 1 wherein the processor unit is arranged to analyse the at least one speed signal to determine if the speed of rotation of the rotor reduces at a rate of more than 7% per second.

7. A machine as claimed in claim 1 wherein the machine is a gas turbine engine.

8. A machine as claimed in claim 7 wherein the blades are fan blades or compressor blades.

9. A machine comprising a rotor having a plurality of blades arranged in a set, an apparatus for detecting an impact on one or more of the blades comprising at least one speed sensor arranged to detect the speed of rotation of the rotor and to produce at least one speed signal corresponding to the speed of rotation of the rotor, a processor unit being arranged to analyse the at least one speed signal to determine if the speed of rotation of the rotor reduces by more than a predetermined level, the processor unit being arranged to produce a signal indicative of an impact to at least one of the blades if the speed of rotation reduces by more than the predetermined level and to send the signal to an indicator device and wherein the apparatus comprises a first speed sensor and a second speed sensor, the first speed sensor is arranged adjacent the first end of the rotor and the second speed sensor is arranged adjacent the second end of the rotor, the first speed sensor is arranged to detect the speed of rotation of the first end of the rotor and to produce at least one speed signal corresponding to the speed of rotation of the first end of the rotor, the second speed sensor is arranged to detect the speed of rotation of the second end of the rotor and to produce at least one speed signal corresponding to the speed of rotation of the second end of the rotor, the processor unit is arranged to analyse the speed signals to determine the difference in speed between the first end and the second end of the rotor to determine the angle of twist between the first end and the second end of the rotor, the processor unit is arranged to analyse the angle of twist to determine if the angle of twist of the rotor oscillates by more than a predetermined level from an average level, the processor unit being arranged to produce a signal indicative of an impact to at least one of the blades if the angle of twist oscillates by more than the predetermined level and to send the signal to an indicator device.

10. A machine as claimed in claim 9 wherein the processor unit is arranged to analyse the angle of twist to determine if the amplitude of the oscillation of the angle of twist of the rotor is more than 0.5°.

11. A machine as claimed in claim 9 wherein the processor unit is arranged to analyse the angle of twist to determine if the amplitude of the oscillation of the angle of twist of the rotor is between 0.5° and 1°.

12. A machine as claimed in claim 9 wherein the machine is a gas turbine engine.

13. A machine as claimed in claim 9 wherein the blades are fan blades or compressor blades.

14. A method of detecting an impact on one or more blades of a machine, the machine comprising a rotor having a plurality of blades arranged in a set, the method for detecting an impact on one or more of the blades comprising detecting the speed of rotation of the rotor and to produce at least one speed signal corresponding to the speed of rotation of the rotor, analysing the at least one speed signal to detect a rapid drop in the speed of rotation of the rotor from a correct operating speed of rotation of the rotor for a particular operating condition, analyzing the at least one speed signal to determine if the speed of rotation of the rotor reduces by more than a predetermined rate, producing a signal indicative of impact to at least one of the blades if the speed of rotation reduces by more than the predetermined rate and sending the signal to an indicator device.

15. A method as claimed in claim 14 wherein the rotor has a first axial end and a second axial end, the blades being arranged at the first axial end of the rotor.

16. A method as claimed in claim 15 comprising detecting the speed of rotation of the rotor adjacent the first axial end of the rotor and analysing the at least one speed signal to determine if the speed of rotation of the rotor reduces above a predetermined rate.

17. A method as claimed in claim 14 comprising determining if the speed of rotation of the rotor reduces at a rate of more than 500 rpm per second.

18. A method as claimed in claim 17 comprising determining if the speed of rotation of the rotor reduces at a rate of between 500 rpm per second and 1000 rpm per second.

19. A method as claimed in claim 14 comprising analysing the at least one speed signal to determine if the speed of rotation of the rotor reduces at a rate of more than 7% per second.

20. A method as claimed in claim 14 wherein the machine is a gas turbine engine.

21. A method as claimed in claim 20 wherein the blades are fan blades or compressor blades.

22. A method of detecting an impact on one or more blades of a machine, the machine comprising a rotor having a plurality of blades arranged in a set, the method for detecting an impact on one or more of the blades comprising detecting the speed of rotation of the rotor and to produce at least one speed signal corresponding to the speed of rotation of the rotor, analysing the at least one speed signal to determine if the speed of rotation of the rotor reduces by more than a predetermined level, producing a signal indicative of impact to at least one of the blades if the speed of rotation reduces by more than the predetermined level and sending the signal to an indicator device wherein the rotor has a first axial end and a second axial end, the blades being arranged at the first axial end of the rotor and comprising detecting the speed of rotation of the first end of the rotor to produce at least one speed signal corresponding to the speed of rotation of the first end of the rotor, detecting the speed of rotation of the second end of the rotor to produce at least one speed signal corresponding to the speed of rotation of the second end of the rotor, analysing the speed signals to determine the difference in speed between the first end and the second end of the rotor to determine the angle of twist between the first end and the second end of the rotor, analysing the angle of twist to determine if the angle of twist of the rotor oscillates by more than a predetermined level from an average level, producing a signal indicative of an impact to at least one of the blades if the angle of twist oscillates by more than the predetermined level and sending the signal to an indicator device.

23. A method as claimed in claim 22 comprising analysing the angle of twist to determine if the amplitude of the oscillation of the angle of twist of the rotor is more than 0.5°.

24. A method as claimed in claim 22 comprising analysing the angle of twist to determine if the amplitude of the oscillation of the angle of twist of the rotor is between 0.5° and 1°.

25. A method as claimed in claim 22 wherein the machine is a gas turbine engine.

26. A method as claimed in claim 22 wherein the blades are fan blades or compressor blades.

* * * * *